(12) United States Patent
Mariani et al.

(10) Patent No.: US 12,722,426 B2
(45) Date of Patent: Sep. 1, 2026

(54) MOTORCYCLE TYRE

(71) Applicant: Pirelli Tyre S.p.A., Milan (IT)

(72) Inventors: Mario Mariani, Milan (IT); Giuliano Bonaccorsi, Milan (IT); Alessio Casali, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 54 days.

(21) Appl. No.: 18/710,944

(22) PCT Filed: Nov. 11, 2022

(86) PCT No.: PCT/IB2022/060876

§ 371 (c)(1),
(2) Date: May 16, 2024

(87) PCT Pub. No.: WO2023/099996

PCT Pub. Date: Jun. 8, 2023

(65) Prior Publication Data

US 2025/0026155 A1 Jan. 23, 2025

(30) Foreign Application Priority Data

Dec. 1, 2021 (IT) ........................ 102021000030455

(51) Int. Cl.
*B60C 11/11* (2006.01)
*B60C 11/03* (2006.01)

(52) U.S. Cl.
CPC ............. *B60C 11/11* (2013.01); *B60C 11/033* (2013.01); *B60C 2200/10* (2013.01); *B60C 2200/14* (2013.01)

(58) Field of Classification Search
CPC ............................... B60C 11/11; B60C 11/033
See application file for complete search history.

(56) References Cited

U.S. PATENT DOCUMENTS 4,470,443 A 9/1984 Eraud
2012/0267019 A1* 10/2012 Gatti ......................... B60C 9/22 152/209.1

(Continued)

FOREIGN PATENT DOCUMENTS

BR 8301449 A 11/1983
EP 0100226 A2 2/1984

OTHER PUBLICATIONS

International Search Report form the European Patent Office in corresponding International Application No. PCT/IB2022/060876 mailed Jan. 23, 2023.

(Continued)

*Primary Examiner* — Steven D Maki
(74) *Attorney, Agent, or Firm* — Finnegan, Henderson, Farabow, Garrett & Dunner, L.L.P.

(57) ABSTRACT

A tyre for vehicle wheels comprises a tread band including a plurality of blocks and grooves that define in the tread band a void/solid ratio comprised between 0.4 and 0.65 and that form a tread pattern which is symmetrical with respect to an equatorial plane (X-X) of the tyre. The tread pattern includes a pair of circumferential grooves (20) arranged on opposite sides with respect to the equatorial plane and which define a central annular portion of tread band and a pair of lateral annular portions of tread band arranged on opposite sides with respect to said central annular portion. The central annular portion of tread band comprises a plurality of circumferentially consecutive central blocks (30, 60) arranged astride of the equatorial plane and having a maximum width equal to, or greater than. 50% of a radial section maximum width of the tyre. The central blocks (30, 60) are separated from one another by a respective central transversal groove (45, 50) having a circumferential length less than that of a circumferentially adjacent central block (30, 60). Each lateral annular portion of tread band comprises a (Continued)

plurality of circumferentially consecutive lateral blocks (80, 90) separated from one another by a respective lateral transversal groove (85, 95).

15 Claims, 7 Drawing Sheets

(56) References Cited

U.S. PATENT DOCUMENTS

| | | | | |
|---|---|---|---|---|
| 2013/0126061 | A1 | 5/2013 | Bestgen | |
| 2019/0126689 | A1 * | 5/2019 | Marui | B60C 11/1376 |
| 2019/0275843 | A1 | 9/2019 | Misani et al. | |

OTHER PUBLICATIONS

Written Opinion of the International Searching Authority from the European Patent Office in corresponding International Application No. PCT/IB2022/060876 mailed Jan. 23, 2023.
Knight, L., XP055925590, "Five Hot 50/50 Adventure Tires of 2016", Dec. 16, 2016, https://adventuremotorcycle.com/gear/50-50-adventure-motorcycle-tires-2016.
European Search Report Issued in Application No. 26154603.0 dated Apr. 16, 2026, 10 pages.

* cited by examiner

H
1
f
10
3a
3
9
E
6a
6
2
7
8
5
4
C
X
100
X
r
E

MOTORCYCLE TYRE

This application is a national stage entry application under 35 U.S.C. § 371 of International Application No. PCT/IB2022/060876, filed on Nov. 11, 2022, and claims priority to Italian Application No. 102021000030455, filed Dec. 1, 2021; the contents of each application is incorporated herein by reference in its entirety.

The present invention relates to a motorcycle tyre.

The tyre of the invention is intended to be mounted on the front wheel and/or on the rear wheel of "big enduro" (or "big adventouring" or "dual purpose") motorcycles, which as known are motorcycles with high piston displacement, power and mass, designed to be driven both on asphalt roads and off-road. Such motorcycles generally have a piston displacement equal to or greater than 1000 $cm^3$, power equal to or greater than 100 cv, maximum torque equal to or greater than 100 Nm and mass equal to or greater than 180 Kg.

Examples of "big enduro" motorcycles are BMW GS 1300, KTM 1290 Super Adventure R and Honda CRF1100L Africa Twin.

Motorcycles of this type have a very wide usage spectrum, which ranges from a mainly road use, comparable to sport touring also moving towards supersport, to an off-road use even more extreme than simple paved roads, like for example driving on all-terrain circuits, so-called dirt tracks, or tracks comprising riverbeds, soft ground, mud, sand and rough terrain of various kinds and difficulties.

In order to satisfy all these types of use, the market provides for different tyre products each focused on a well-defined type of use, for example: road sports driving, road touring driving, journey combined with dirt road, road driving combined with easy off-road, extreme off-road combined with road driving.

Typically, tyres for "big enduro" motorcycle mainly intended for extreme off-road use combined with road driving are marked M+S and are, for example, approved to reach maximum speeds equal to 160 Km/h (ETRTO speed index: Q). Such tyres generally have a radial section maximum width comprised between 90 and 170 (for example between 90 and 120 the front tyres and between 130 and 170 the rear tyres) and are mounted on wheel rims having fitting diameters typically comprised between about 17 inches and about 21 inches (for example between 19 and 21 inches the front tyres and between 17 and 18 inches the rear tyres).

The tyre of the present invention is of the type approved for road use and is intended for mainly off-road use.

PRIOR ART

The tyres for "Big enduro" motorcycle comprise a tread band having a tread pattern defined by a plurality of blocks separated by circumferential and transversal grooves, such blocks being arranged both in the central annular portion of the tread band and in the opposite annular shoulder portions of the tread band. Such tyres typically have a void/solid ratio comprised between about 0.4 and about 0.65.

SUMMARY OF THE INVENTION

Throughout the present description and in the following claims, when reference is made to certain values of certain angles, these are deemed to be absolute values, i.e. both positive values and negative values with respect to a plane or direction of reference, unless specified otherwise.

Moreover, when reference is made to any range of values comprised between a minimum value and a maximum value, the aforementioned minimum and maximum values are deemed to be included in the aforementioned range, unless expressly stated to the contrary.

Moreover, all of the ranges include any combination of the described minimum and maximum values and include any intermediate range, even if not expressly described specifically.

Even if not expressly indicated, any numerical value is deemed to be preceded by the term "about" to also indicate any numerical value that differs slightly from the one described, for example to take into account the dimensional tolerances typical of the field of reference. Hereinafter, the following definitions apply.

The term "elastomeric material" is used to indicate a material comprising a vulcanizable natural or synthetic polymer and a reinforcing filler, wherein such a material, at room temperature and after having been subjected to vulcanization, can have deformations caused by a force and is capable of quickly and energetically recovering the substantially original shape and size after the elimination of the deforming force (according to the definitions of standard ASTM D1566-11 Standard Terminology Relating To Rubber).

The term "motorcycle tyre" is used to indicate a tyre having a high curvature ratio (typically greater than 0.20) and capable of reaching high camber angles during cornering.

The term "curvature ratio" is used to indicate the ratio of the distance comprised between the radially highest point of the tread band and the radial section maximum width of the tyre (such a distance also being identified as "arrow"), and the maximum width of the tyre, in a cross section thereof.

The term "radial section maximum width", or "maximum cord", is used to indicate the maximum width of the profile of the tyre, i.e. the size of the segment having as ends the two axially outermost points of the profile of the tread band.

The term "equatorial plane" of the tyre is used to indicate a plane perpendicular to the rotation axis of the tyre and that divides the tyre into two symmetrically equal parts.

The term "tread pattern" is used to indicate the representation of all of the points of the tread band (grooves included) on a plane perpendicular to the equatorial plane of the tyre and tangent to the maximum diameter of the tyre. The tread pattern is defined by a plurality of blocks separated by grooves and possibly including recesses.

The term "block" is used to indicate a portion of tread band delimited by grooves. In the case in which the block is positioned on the axially outermost portion of the tread band, it is delimited in the axial direction by the axially outermost face of the tread band and, in an axially inner position, by at least one groove.

The term "groove" is used to indicate a furrow formed on the tread band to delimit a block portion.

The term "recess" is used to indicate a groove formed in a block and having a depth less than that of a groove.

The sizes of angles, and/or linear quantities (distances, widths, lengths, amplitudes, axial and/or circumferential parts, etc.), and/or surfaces are referred to the tread pattern as defined above.

The term "width" is used to indicate a dimension measured along a direction perpendicular to the equatorial plane.

The term "circumferential length" is used to indicate a dimension measured along a direction lying on, or parallel to, the equatorial plane.

The term "maximum extension" referred to a block indicates the distance between the two axially or circumferentially outermost points of the block measured along a direction perpendicular to the equatorial plane or along a direction parallel to, or lying in, the equatorial plane, respectively.

The terms "radial" and "axial" and the terms "radially inner/outer" and "axially inner/outer" are used referring to a direction substantially parallel to the equatorial plane of the tyre and to a direction substantially perpendicular to the equatorial plane of the tyre, respectively, i.e. to a direction substantially perpendicular to the rotation axis of the tyre and to a direction substantially parallel to the rotation axis of the tyre, respectively.

The terms "circumferential" and "circumferentially" are used referring to the direction of circumferential extension of the tyre, i.e. to the rolling direction of the tyre, which corresponds to a direction lying on a plane coinciding with or substantially parallel to the equatorial plane of the tyre.

The term "circumferential extension" of the tyre, or of the tread band or of portions thereof, is used to indicate the extension in plan of the radially outermost surface of the tyre, or of the tread band or of portions thereof, on a plane tangent to the tyre.

The terms "axially inner" and "axially outer" indicate a position respectively closer to, and farther from, the equatorial plane with respect to a reference element. Thus, for example, a first face of a block is axially inner with respect to a second face of the block when the axial distance of the first face from the equatorial plane is less than that of the second face. Similarly, a first face of a block is axially outer with respect to a second face of the block when the axial distance of the first face from the equatorial plane is greater than that of the second face.

The term "circumferentially outer" referred to the points of a block indicates the position of that point of the block that is farther from the center of the block along the circumferential direction with respect to the other points of the block.

The term "substantially axial direction" is used to indicate a direction inclined, with respect to the equatorial plane of the tyre, by an angle comprised between 70° and 90°.

The term "substantially circumferential direction" is used to indicate a direction oriented, with respect to the equatorial plane of the tyre, at an angle comprised between 0° and 20°.

The term "circumferential grooves" is used to indicate a groove comprising at least one portion of groove that extends along a substantially circumferential direction.

The term "transversal groove" is used to indicate a groove comprising at least one portion of groove that extends along a substantially axial direction.

When reference is made to the angle of the grooves or of the blocks or of a face of the block (or of a portion of such a face) with respect to the equatorial plane of the tyre, such an angle is deemed for each point of the groove or of the block or of the face of the block (or of a portion of such a face) as the angle, comprised in an absolute value between 0° and 90°, formed by carrying out a rotation that, starting from the direction defined by the equatorial plane in the tread pattern, proceeds up to the direction tangent to the groove or to the block passing through such a point. In the case of a tyre intended to be mounted on a front wheel of a motorcycle, the aforementioned rotation is deemed to be carried out from a vector oriented in the direction of rotation of the tyre, whereas in the case of a tyre intended to be mounted on a rear wheel of a motorcycle, the aforementioned rotation is deemed to be carried out from a vector oriented in a direction opposite to the direction of rotation of the tyre. In the case in which the reference plane is not the equatorial plane but a plane perpendicular to the equatorial plane, the values of the angles are complementary to those measured with reference to the equatorial plane.

The measurements of circumferential lengths of grooves or blocks that intersect the equatorial plane of the tyre are taken at the equatorial plane of the tyre.

The term "substantially parallel" indicates not only a condition of perfect parallelism, but also a condition diverging from the perfect parallelism by an angle not greater than 10°.

The term "void/solid ratio" is used to indicate the ratio between the overall surface of the grooves of a predetermined annular portion of the tread pattern of the tyre (possibly of the entire tread band or tread pattern) and the surface of the predetermined portion of tread pattern (possibly of the entire tread band or tread pattern).

The term "footprint" of the tyre is used to indicate the portion of tyre in contact with the ground or road surface when the tyre is mounted on a rim of a wheel and a predetermined vertical load is exerted on the tyre.

Hereinafter, a face, or a portion or part thereof, of a block is considered "inclined" with respect to a reference plane, like for example the equatorial plane, when at least 50% of the surface of such a face (or a portion or part at least equal to 50% of the surface of such a face) is inclined with respect to the reference plane. The inclined face (or portion or part of such a face) is not necessarily flat, but can also be slightly curved, such a curve being interpolable by a plane tangent to the curve in any point thereof or by a plane that comprises the ends of such a curve. The inclination of the opposite circumferentially outer faces of the block results in the possibility of identifying two opposite circumferentially outer points in the block.

Hereinafter, a block is considered "circumferentially offset" with respect to another block when the circumferentially central points of the two blocks do not lie on a same plane perpendicular to the equatorial plane of the tyre.

The term "module" referred to a tread band, and in particular to the tread pattern, is used to indicate a portion of tread pattern repeated identically in succession along the entire circumferential extension of the tread band. The modules, whilst keeping the same pattern configuration, can nevertheless have different circumferential lengths.

The Applicant has considered a motorcycle type, the "big enduro" motorcycles, which, as already stated, has a very wide usage range.

The Applicant has observed that in order to cover their entire usage range in an optimal manner, "big enduro" motorcycles should be equipped with tyres configured to allow high performance both on the road (mainly stability at high speeds, roadholding in a dry road and in a wet road, handling) and off-road (mainly traction, controllability and directionality), further to be capable of travelling many kilometers.

However, the Applicant has found that considering the current and increasingly common tendency to obtain on the one hand extreme road performance and on the other hand extreme off-road performance, the aforementioned performance characteristics are at least partially in contrast with each other.

The Applicant has indeed noted that tyres that allow high performance on the road usually have severe off-road performance limitations and vice-versa.

The Applicant has also noted that tyres that balance road and off-road use with a good compromise solution do not allow satisfactory extreme performance to be obtained in any of the two environments (road and off-road).

The Applicant has observed that recently, consistent with customers' requirements, the market has moved towards more specialist solutions, by providing many types of tyres for "big enduro" motorcycles, each of such type being focused on a particular use of the motorcycle.

Accordingly, the Applicant has proposed tyres for "big enduro" motorcycles suitable for mainly road use and tyres for "big enduro" motorcycles suitable for mainly off-road use.

Tyres for mainly road use are made to maximize performance in terms of stability at high speeds, roadholding in the dry road and in the wet road, handling, mileage, traction and braking in the wet road, comfort and regular wear in travel on asphalt road surfaces. Such tyres, being often used in every climate condition throughout the year, must also allow high reliability and performance on low-grip road surfaces, like for example wet road surfaces.

Tyres for mainly off-road use, even extreme off-road use, on the other hand are made to maximize performance in terms of grip, traction, controllability and directionality on rough, slippery and/or inconsistent terrain (for example sand, mud, gravel), so as to be able to effectively transmit even high driving and braking torques to the ground. Such tyres must also allow the aforementioned performance on wet terrain.

The Applicant has focused its attention on the types of tyres for "big enduro" motorcycles designed for mainly off-road use.

Such tyres are mainly chosen by users who seek performance in off-road tracks and who foresee a road use limited to journeys to/from off-road tracks.

The Applicant has thought to make a tyre that is capable of achieving excellent off-road performance and that has a road behavior suitable for allowing the user to make, in conditions of safety and comfort, even longer and more elaborate road journeys than the simple journeys to/from off-road tracks, particularly on a wet road surface, thus where grip becomes a particularly critical aspect.

The Applicant has observed that in order to obtain the aforementioned road behavior without penalizing off-road behavior it is advisable to provide for a tread pattern having a mutual arrangement and sizing of blocks and grooves such that, during the rolling of the tyre in a straight line and in a bend (both to the left and to the right), at the footprint of the tyre there is an amount of blocks and/or portions of blocks in contact with the ground sufficient to obtain the desired conditions of grip with the ground, and an amount of grooves sufficient to offer many gripping fronts with the ground and to allow the immediate drainage of mud or sand (or, more generally, of soft ground) in off-road tracks and of water on wet road surfaces.

The Applicant has realised that all of this is possible by providing a tread pattern which is symmetrical with respect to the equatorial plane of the tyre and which comprises a central annular portion defined between two circumferential grooves arranged on opposite sides with respect to the equatorial plane, the central annular portion comprising a plurality of blocks having a width greater than that of tyres of the same type currently available on the market, in particular greater than, or equal to, 50% of the radial section maximum width of the tyre, and a plurality of transversal grooves having a circumferential length smaller than that of a circumferentially adjacent central block.

The Applicant indeed believes that a mutual arrangement of blocks and grooves as described above makes it possible to optimize the distribution of the contact pressure with the ground, making it more even over the entire footprint, and that a sizing of the blocks as described above makes it possible to increase the drift stiffness, all to the benefit of grip and driving stability on dry and wet road surfaces, also ensuring the desired roadholding on the soft terrains typical of off-road tracks. Moreover, the provision of circumferential grooves on both sides of the tread band with respect to the equatorial plane makes it possible to achieve the desired immediate drainage of mud or sand in off-road tracks and of water on wet road surfaces both during travel in a straight line and during cornering to the left or right, the tyre thus having a behavior that, thanks to the symmetry of the tread pattern, is substantially the same during bends to the left and to the right.

The Applicant has found that such a tread pattern also makes it possible to obtain an unexpected improvement in off-road performance, with particular reference to traction.

According to the Applicant, the unexpected improvement of the traction in off-road can be at least partially attributed to the fact that the circumferential length of the blocks and of the transversal grooves provided in the central portion of the tread band and the axial size of such blocks is such that the adhesion effect on soft terrain like those typical of off-road tracks is accentuated, but avoiding the transversal grooves becoming stably filled with earth.

The present invention relates to a motorcycle tyre comprising a tread band including a plurality of blocks and grooves.

Preferably, the tread band includes a plurality of blocks and grooves that define in the tread band a void/solid ratio comprised between 0.4 and 0.65.

Preferably, the blocks and the grooves form a tread pattern which is symmetrical with respect to an equatorial plane of the tyre.

Preferably, the tread pattern includes a pair of circumferential grooves arranged on opposite sides with respect to the equatorial plane and defining a central annular portion of tread band and a pair of lateral annular portions of tread band arranged on opposite sides with respect to said central annular portion.

Preferably, the central annular portion of tread band comprises a plurality of consecutive central blocks circumferentially arranged astride of the equatorial plane.

Preferably, the central blocks have a maximum width equal to, or greater than, 50% of a radial section maximum width of the tyre.

Preferably, the central blocks are separated from one another by a respective central transversal groove.

Preferably, such a central transversal groove has a circumferential length less than the circumferential length of a circumferentially adjacent central block.

Preferably, each lateral annular portion of tread band comprises a plurality of circumferentially consecutive lateral blocks separated from one another by a respective lateral transversal groove.

The Applicant has found that a tread pattern made in accordance with what is described above allows a tyre for "big enduro" motorcycle intended for mainly off-road use to combine excellent off-road performance with better behavior on the road with respect to what is offered today by the tyres available on the market.

The present invention can have at least one of the preferred features described hereinafter.

Preferably, the void/solid ratio is greater than, or equal to, 0.5.

Preferably, the void/solid ratio is less than, or equal to, 0.6.

In preferred embodiments, the void/solid ratio is comprised between 0.5 and 0.6, for example equal to 0.51 in rear tyres of size 170/60/R17 and equal to 0.56 in rear tyres of size 150/70/R18.

The Applicant has found that the aforementioned values of the void/solid ratio make it possible to maximize the off-road performance of the tyre whilst maintaining the same performance on the road.

Preferably, the circumferential length of the central transversal groove is greater than, or equal to, 20% of the maximum width of the central blocks, for example equal to or greater than 21% in rear tyres of size 170/60/R17 and equal to or greater than 25% in rear tyres of size 150/70/R18.

Preferably, the circumferential length of the central transversal groove is less than, or equal to, 50% of the maximum width of the central blocks, for example less than or equal to 34% in rear tyres of size 170/60/R17 and less than or equal to 41% in rear tyres of size 150/70/R18.

In preferred embodiments, the circumferential length of the central transversal groove is comprised between 20% and 50% of the maximum width of the central blocks, for example between 21% and 34% in rear tyres of size 170/60/R17 and between 25% and 41% in rear tyres of size 150/70/R18.

The Applicant has observed that, the same size of the blocks being equal, the penetration capability of the blocks in the ground of off-road tracks is greater as the circumferential length of the transversal grooves that separate the various blocks increases and has found that the aforementioned percentage values make it possible to optimize such a penetration capability, to the benefit of off-road performance.

Preferably, the maximum width of the central blocks is greater than, or equal to, 95 mm.

Preferably, the maximum width of the central blocks is less than, or equal to, 120 mm.

In preferred embodiments, the maximum width of the central blocks is comprised between 95 mm and 120 mm, for example equal to 104.5 in rear tyres of size 170/60/R17 and equal to 100.5 mm in rear tyres of size 150/70/R18.

Preferably, the ratio between the circumferential length of the central transversal groove and the circumferential length of a circumferentially adjacent central block is greater than, or equal to, 0.6.

Preferably, said ratio is less than, or equal to, 0.9.

Preferably, said ratio is comprised between 0.6 and 0.9, more preferably between 0.6 and 0.8 in rear tyres of size 170/60/R17 and between 0.7 and 0.9 in rear tyres of size 150/70/R18.

For example, said ratio is equal to 0.65 in rear tyres of size 170/60/R17 and equal to 0.82 in rear tyres of size 150/70/R18.

Preferably, two circumferentially consecutive central blocks have different circumferential lengths.

Preferably, a first central block has a circumferential length such that the ratio between said circumferential length and the circumferential extension of the tyre is greater than, or equal to, 0.013.

Preferably, said ratio is less than, or equal to, 0.018.

In preferred embodiments, said ratio is comprised between 0.013 and 0.018, for example equal to 0.017 in rear tyres of size 170/60/R17 and equal to 0.015 in rear tyres of size 150/70/R18.

Preferably, the circumferential length of said first central block is greater than, or equal to, 28 mm.

Preferably, the circumferential length of said first central block is less than, or equal to, 36 mm.

In preferred embodiments, the circumferential length of said first central block is comprised between 28 mm and 36 mm, for example equal to 34.3 mm in rear tyres of size 170/60/R17 and equal to 30.5 mm in rear tyres of size 150/70/R18.

Preferably, a second central block has a circumferential length such that the ratio between said circumferential length and the circumferential extension of the tyre is greater than 0.017.

Preferably, said ratio is less than 0.022.

In preferred embodiments, said ratio is comprised between 0.017 and 0.022, for example equal to 0.021 in rear tyres of size 170/60/R17 and equal to 0.019 in rear tyres of size 150/70/R18.

Preferably, the circumferential length of said second central block is greater than, or equal to, 35 mm.

Preferably, the circumferential length of said second central block is less than, or equal to, 44 mm.

In preferred embodiments, the circumferential length of said second central block is comprised between 35 mm and 44 mm, for example equal to 42.2 mm in rear tyres of size 170/60/R17 and equal to 37.9 mm in rear tyres of size 150/70/R18.

Preferably, said second central block is circumferentially consecutive to the first central block.

Preferably, two circumferentially consecutive central transversal grooves have different circumferential lengths.

Preferably, a first central transversal groove has a circumferential length such that the ratio between said circumferential length and the circumferential extension of the tyre is greater than, or equal to, 0.008.

Preferably, said ratio is less than, or equal to, 0.015.

In preferred embodiments, said ratio is comprised between 0.008 and 0.014, for example equal to 0.011 in rear tyres of size 170/60/R17 and equal to 0.012 in rear tyres of size 150/70/R18.

Preferably, the circumferential length of said first central transversal groove is greater than, or equal to, 18 mm, more preferably greater than, or equal to, 21 mm.

Preferably, the circumferential length of said first central transversal groove is less than, or equal to, 30 mm, more preferably less than, or equal to, 26 mm.

In preferred embodiments, the circumferential length of said first central transversal groove is comprised between 18 mm and 30 mm, preferably between 21 mm and 26 mm, for example equal to 22.3 mm in rear tyres of size 170/60/R17 and equal to 25 mm in rear tyres of size 150/70/R18.

Preferably, a second central transversal groove has a circumferential length such that the ratio between said circumferential length and the circumferential extension of the tyre is greater than, or equal to, 0.011.

Preferably, said ratio is less than, or equal to, 0.018.

In preferred embodiments, said ratio is comprised between 0.011 and 0.018, for example equal to 0.013 in rear tyres of size 170/60/R17 and equal to 0.015 in rear tyres of size 150/70/R18.

Preferably, the circumferential length of said second central transversal groove is greater than, or equal to, 23 mm, more preferably greater than, or equal to, 26 mm.

Preferably, the circumferential length of said second central transversal groove is less than, or equal to, 35 mm, more preferably less than, or equal to, 32 mm.

In preferred embodiments, the circumferential length of said second central transversal groove is comprised between 23 mm and 35 mm, preferably between 26 mm and 32 mm, for example equal to 27.5 mm in rear tyres of size 170/60/R17 and equal to 30.9 mm in rear tyres of size 150/70/R18.

Preferably, said second central transversal groove is circumferentially consecutive to the first central transversal groove.

Preferably, the tread pattern comprises a plurality of modules, each module comprising at least two central blocks and at least two central transversal grooves, each of the latter being arranged between two respective central blocks.

In particularly preferred embodiments, each module comprises one of said first central blocks and one of said second central blocks.

In alternative embodiments, each module comprises two of said first central blocks and one of said second central blocks, or one of said first central blocks and two of said second central blocks, wherein the two first central blocks and the two second central blocks are circumferentially consecutive.

Preferably, the central blocks are circumferentially offset with respect to the lateral blocks.

This arrangement makes it possible to have many blocks in contact with the ground both during travel in a straight line and when the tyre is laterally inclined, for example to travel a bend, while ensuring a grip on the ground that is continuous and as uniform as possible in the various travel conditions of the tyre and an effective transfer of the lateral and longitudinal stresses between the ground and the various areas of the footprint that are most stressed. In particular, the Applicant has considered that the lateral stresses due to drift and the longitudinal stresses due to traction reach maximum values at the exit front of the footprint, whereas the lateral stresses due to camber reach maximum values at a central portion of the footprint. Through the aforementioned offset arrangement, the Applicant has ensured that, in all of the positions taken up by the tyre with respect to the ground during travel, there are blocks engaged both at the exit front of the footprint and at the central portion of the footprint. All of this is to the benefit in particular of road performance.

Preferably, each central block comprises opposite circumferentially outer faces having an axially central portion perpendicular to the equatorial plane.

Preferably, said axially central portion has a width such that the ratio between such a width and the radial section maximum width of the tyre is greater than, or equal to, 0.25.

Preferably, the aforementioned ratio is less than, or equal to, 0.35.

Preferably, the aforementioned ratio is comprised between 0.25 and 0.35, for example equal to 0.30.

Preferably, the width of said axially central portion is greater than, or equal to, 50 mm, for example equal to 55 mm in rear tyres of size 170/60/R17 and equal to 52 mm in rear tyres of size 150/70/R18.

Preferably, the width of said axially central portion is less than, or equal to, 65 mm, for example equal to 60 mm in rear tyres of size 170/60/R17 and equal to 56 mm in rear tyres of size 150/70/R18.

In preferred embodiments, the width of said axially central portion is comprised between 50 mm and 65 mm.

Preferably, the axially central portions of the opposite circumferentially outer faces of a first plurality of central blocks have different widths. For example, in rear tyres of size 170/60/R17, the width of the axially central portion of a first circumferentially outer face of said blocks is equal to 55 mm and the width of the axially central portion of the other circumferentially outer face of said blocks is equal to 60 mm, whereas in rear tyres of size 150/70/R18 the width of the axially central portion of a first circumferentially outer face of said blocks is equal to 52 mm and the width of the axially central portion of the other circumferentially outer face of said blocks is equal to 56 mm.

Preferably, the aforementioned first faces of the opposite circumferentially outer faces of the aforementioned first plurality of central blocks is an entry face of the central blocks in the footprint of the tyre and the aforementioned other faces of the opposite circumferentially outer faces of the aforementioned first plurality of central blocks is an exit face of the central blocks in the footprint of the tyre.

Preferably, the axially central portions of the opposite circumferentially outer faces of a second plurality of central blocks have equal widths, for example equal to 60 mm in rear tyres of size 170/60/R17 and equal to 56 mm in rear tyres of size 150/70/R18.

Preferably, each block of said first plurality of central blocks is circumferentially interposed between two blocks of said second plurality of central blocks.

Preferably, a plane perpendicular to the equatorial plane and on which at least a first circumferentially outer point of a lateral block of each of said lateral annular portions lays crosses a central block.

More preferably, another plane perpendicular to the equatorial plane and on which at least a second circumferentially outer point belonging to the aforementioned lateral block and arranged on the circumferentially opposite side to said at least a first point lays crosses another central block or crosses a central transversal groove, even more preferably it crosses said other central block.

In this way, the outlet of each central transversal groove on each side of the tyre is obstructed by a respective lateral block.

Preferably, said opposite circumferentially outer faces comprise axially outer portions arranged on opposite sides with respect to said axially central portion.

Preferably, said axially outer portions are inclined with respect to a plane perpendicular to the equatorial plane by a predetermined angle different from 90°.

Preferably, said angle is greater than, or equal to, 50°, more preferably greater than, or equal to, 55°, even more preferably greater than, or equal to, 60°.

Preferably, said angle is less than, or equal to, 89°, more preferably less than, or equal to, 85°, even more preferably less than, or equal to, 80°.

In preferred embodiments, said angle is comprised between 50° and 89°, more preferably between 55° and 85°, even more preferably between 60° and 80°, for example equal to 75°.

Preferably, each axially outer portion of a first circumferentially outer face of each central block is substantially parallel to an axially outer portion of an opposite circumferentially outer face of the same central block.

Preferably, all of the aforementioned axially outer portions that are located on the same side of the tread band with respect to the equatorial plane are substantially parallel to each other.

Preferably, each central block comprises opposite axially outer faces that are inclined with respect to the equatorial plane by a predetermined angle.

Preferably, said angle is greater than, or equal to, 5°.

Preferably, said angle is less than, or equal to, 20°.

In preferred embodiments, said angle is comprised between 5° and 20°, for example equal to 15°.

Preferably, the axially outer faces of a central block are inclined with respect to a plane perpendicular to the equatorial plane on opposite sides with respect to the axially outer faces of a circumferentially consecutive central block.

Preferably, each lateral block comprises opposite circumferentially outer faces that are inclined with respect to the equatorial plane by a predetermined angle different from 90°.

Preferably, said angle is greater than, or equal to, 45°, more preferably greater than, or equal to, 55°.

Preferably, said angle is less than, or equal to, 80°, more preferably less than, or equal to, 70°.

In preferred embodiments, said angle is comprised between 45° and 80°, preferably between 55° and 70°, for example equal to 60° or 65°.

Preferably, each lateral block comprises opposite circumferentially outer faces having the same or different inclinations with respect to the equatorial plane.

Preferably, each lateral block comprises an axially inner face having at least one part inclined with respect to the equatorial plane.

Preferably, the inclined part of at least some of the lateral blocks is substantially parallel to at least one of said axially outer faces of said central block.

Preferably, the axially inner face of a first plurality of lateral blocks is axially inner with respect to the axially inner face of a second plurality of lateral blocks.

Preferably, each lateral block of the first plurality of lateral blocks is circumferentially interposed between two lateral blocks of the second plurality of lateral blocks.

In this way, each circumferential groove extends along a respective zig-zag path or substantially sinusoidal path.

In particularly preferred embodiments, the circumferential grooves extend along respective substantially sinusoidal paths.

This allows the flow of material to be drained (for example mud or sand when off-road or water when on the road) not to be obstructed by portions of circumferentially outer faces of blocks during tyre rolling, with the consequence of obtaining more continuous and regular drainage of such material than with a discontinuous zig-zag arrangement. Moreover, in the footprint there are always two directions of deformation of the central and lateral blocks, thereby obtaining a wider possibility of adaptation of the blocks to natural terrains, to the benefit of lateral grip and directional stability in off-road and on the road.

Preferably, each of such substantially sinusoidal paths is defined between two opposite generatrices, each of which includes in succession, along the circumferential direction and within every single module, an axially outer face of a first central block or an axially inner face of a first lateral block, a substantially circumferential part of a first central transversal groove that is circumferentially adjacent to the first central block or a substantially circumferential part of a first lateral transversal groove that is circumferentially adjacent to the first lateral block, an axially outer face of a second central block that is circumferentially adjacent to the first central block or a substantially circumferential part of a second lateral transversal groove that is circumferentially adjacent to the first lateral block and a substantially circumferential part of a second central transversal groove that is circumferentially adjacent to the second central block or an axially inner face of a second lateral block that is circumferentially consecutive to the first lateral block.

The sinusoidal arrangement is also a consequence of the inclinations of the axially outer faces of the central blocks and of the at least partial inclination of the axially inner faces of the lateral blocks.

Preferably, each circumferential groove has, at the areas thereof axially interposed between a central block and a lateral block, a width greater than, or equal to, 6% of the radial section maximum width of the tyre.

Preferably, said width is less than, or equal to, 10% of the radial section maximum width of the tyre.

In preferred embodiments, said width is comprised between 6% and 10% of the radial section maximum width of the tyre, for example equal to 8%.

DESCRIPTION OF EMBODIMENTS OF THE INVENTION

Further characteristics and advantages of the tyre of the present invention will become clearer from the following detailed description of preferred embodiments thereof, made with reference to the attached drawings. In such drawings.

Figure 2:
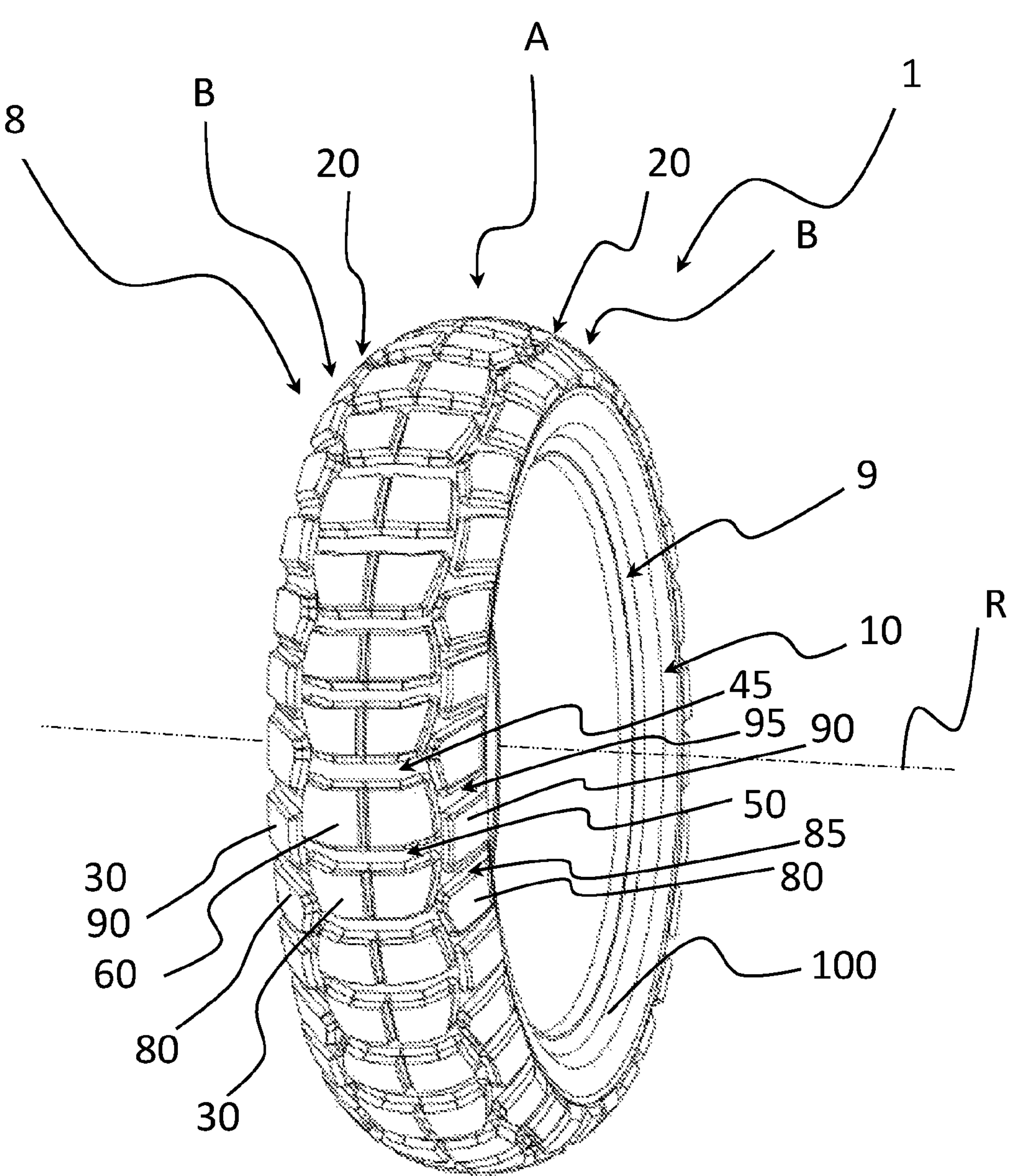
FIG. 2 is a perspective view of a rear tyre in accordance with the present invention.
Figure 4:
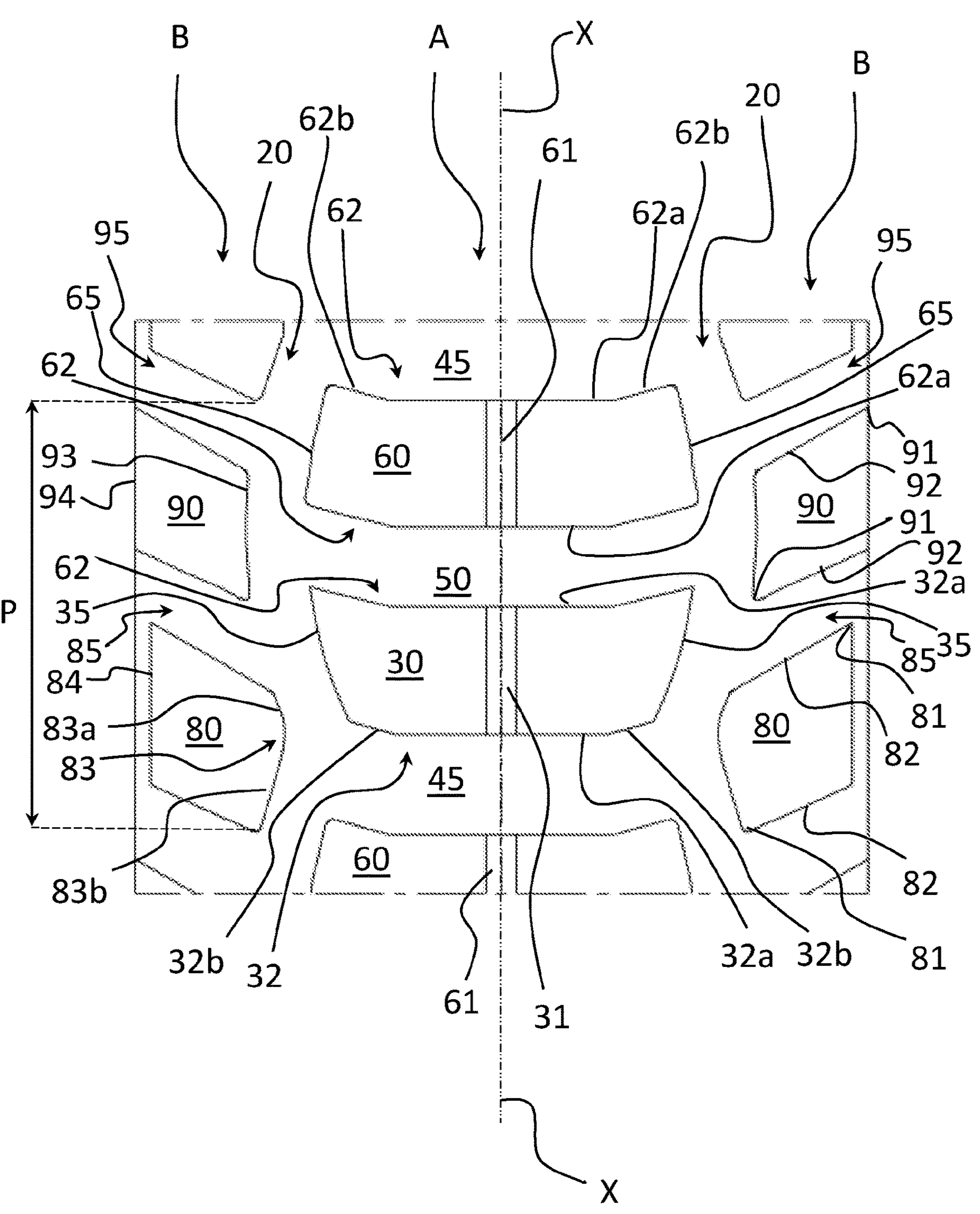
Figure 5:
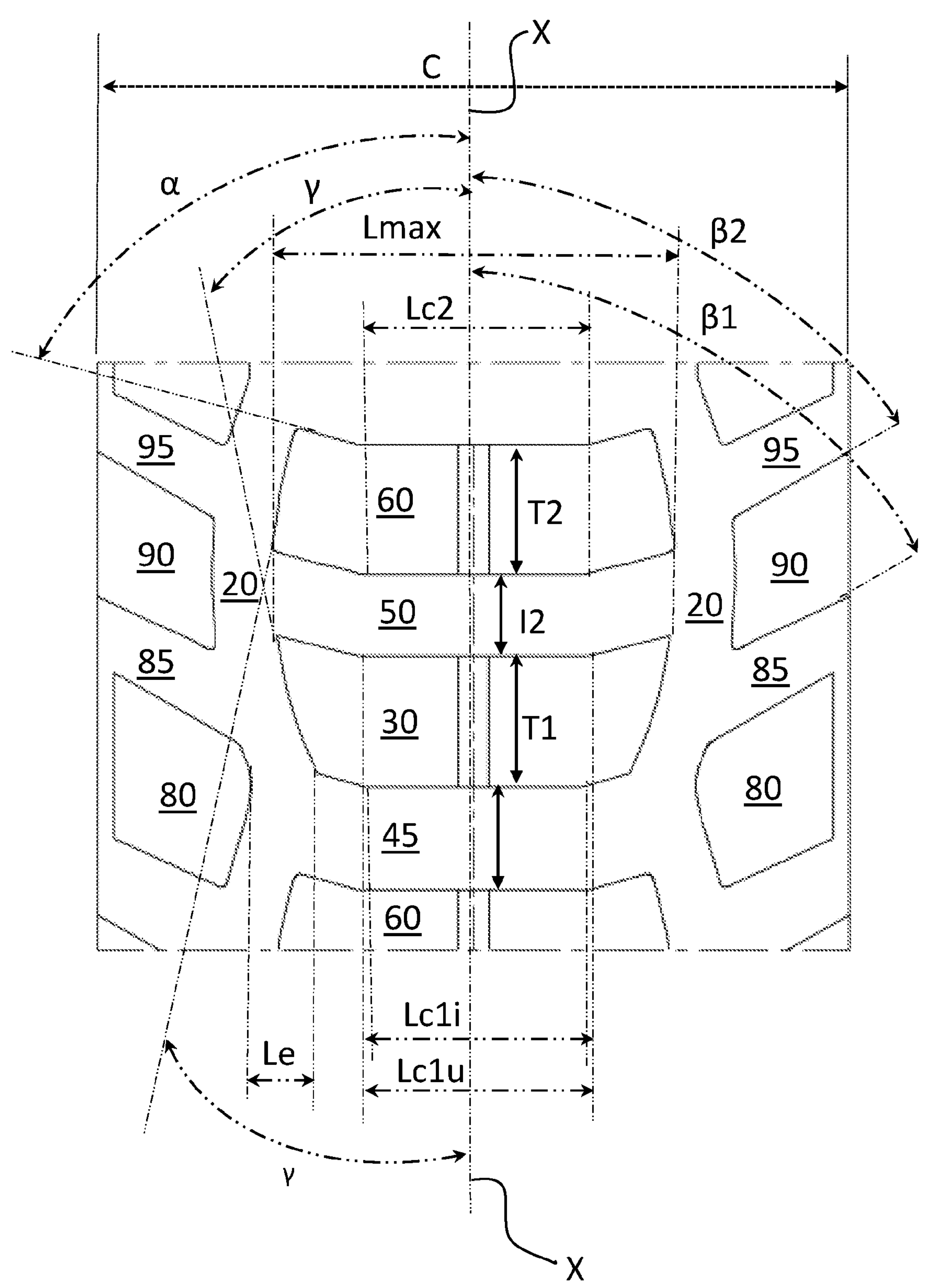
Figure 6:
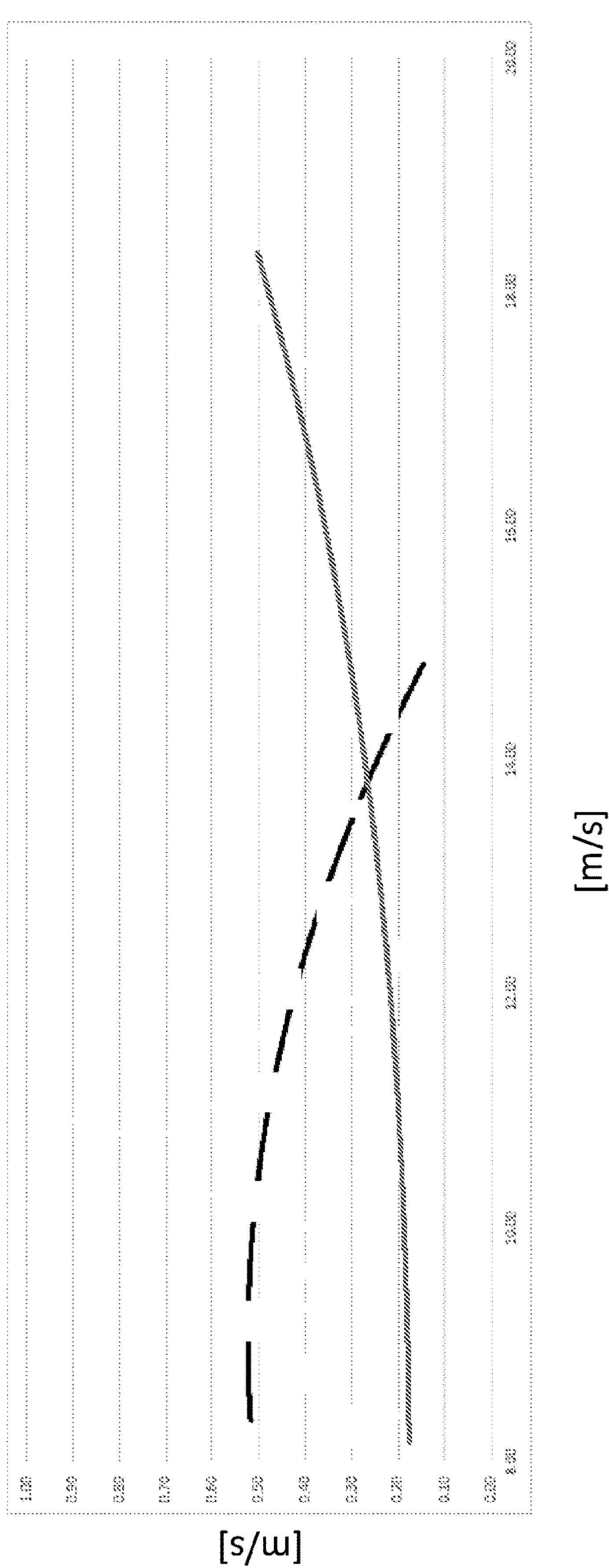
Figure 7:
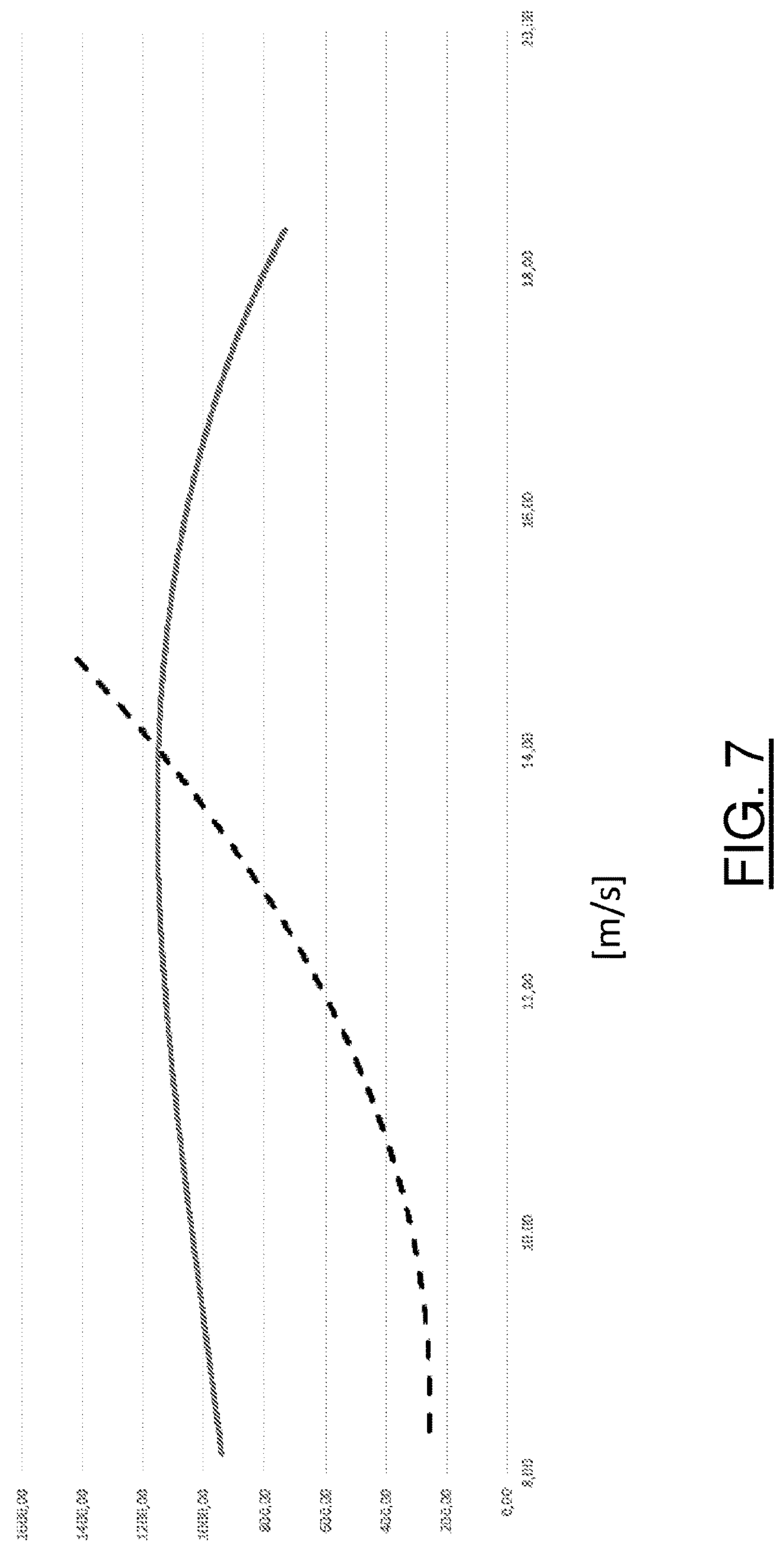

FIG. 4 schematically shows a portion of the tread pattern of the tyre of FIG. 2;

FIG. 5 schematically shows the portion of the tread pattern of FIG. 4 with the addition of some dimensional references;

FIG. 6 shows a graph relating to an indoor comparative test;

FIG. 7 shows another graph relating to the aforementioned indoor comparative test.

Figure 1:
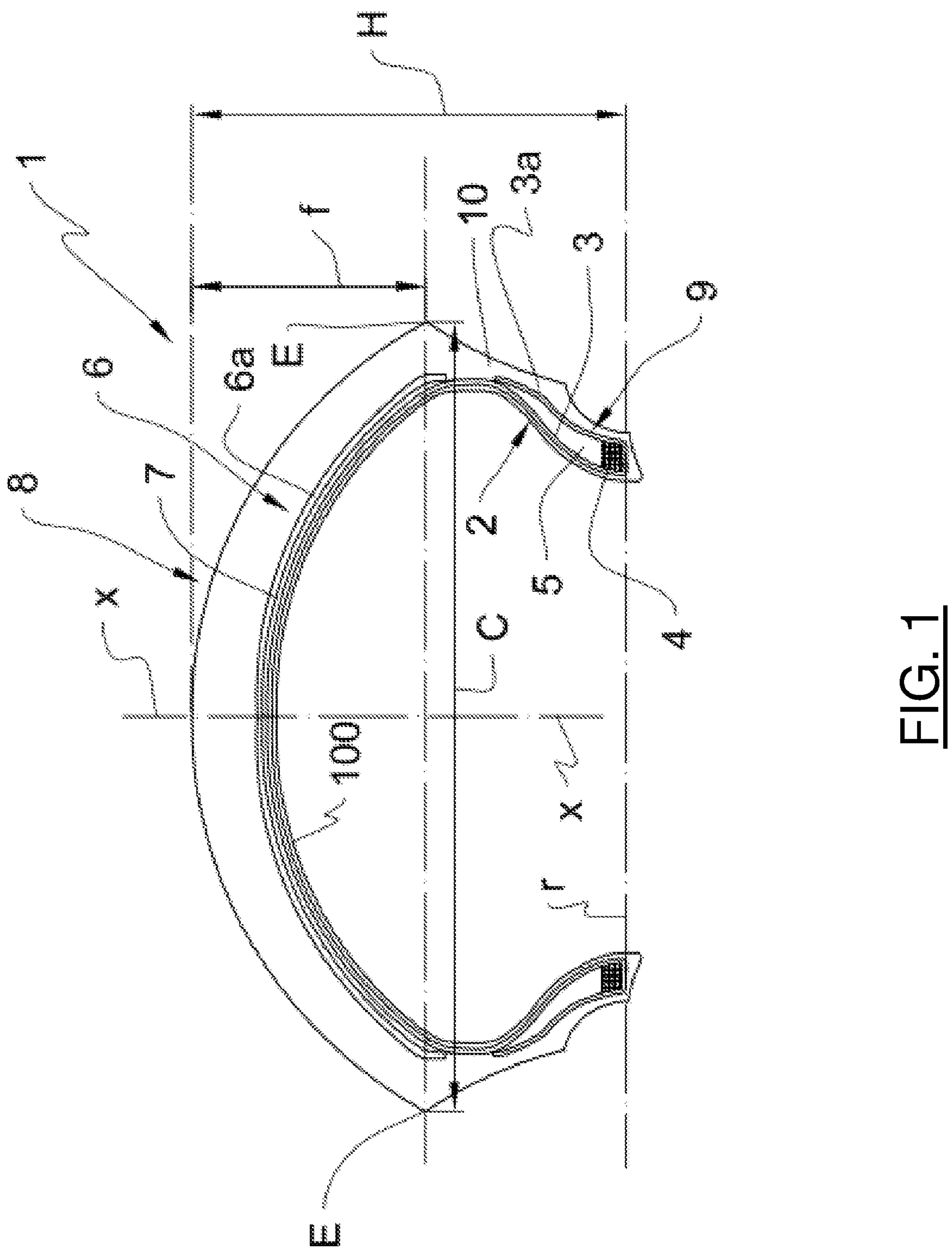
FIG. 1 is a schematic view of a radial section of a rear tyre in accordance with the present invention, where for the sake of simplicity of illustration the tread band is shown without grooves and blocks.

With reference to FIGS. 1 and 2, reference numeral 1 indicates a motorcycle tyre in accordance with the present invention.

The tyre 1 is a rear tyre, but the following description applies identically to a front tyre, except when specific reference is made to rear tyres.

The tyre 1 is a tyre for motorcycle defined as "big enduro" of high piston displacement (for example equal to 1000 $cm^3$) and power (for example equal to 100 cv) and having a motorcycle mass in riding configuration for example equal to 200 Kg or more.

The tyre 1 generally has a radial section maximum width comprised between 90 and 170 (for example between 90 and 120 in the case of a front tyre and between 130 and 170 in the case of a rear tyre) and is configured to be mounted on wheel rims having fitting diameters comprised between about 17 inches and about 21 inches (for example between 19 and 21 inches in the case of a front tyre and between 17 and 18 inches in the case of a rear tyre).

An equatorial plane "X-X" (FIGS. 2 and 3) and a rotation axis R (FIG. 3) are defined in the tyre 1. A circumferential direction arranged according to the direction of rotation of the tyre 1 and therefore parallel to the equatorial plane X-X and an axial direction perpendicular to the equatorial plane "X-X" and/or parallel to the rotation axis R are also defined.

The tyre 1 comprises a carcass structure 2 formed by at least one carcass ply 3 consisting of a sheet of elastomeric material incorporating a plurality of reinforcing cords made of fibrous textile material, not illustrated.

In the tyre of FIG. 2, the carcass structure 2 is of the radial type, i.e. the reinforcing cords of said at least one carcass layer 3 are arranged substantially parallel to one another and in the radial direction, i.e. according to an angle comprised between 70° and 110°, more preferably between 80° and 100°, with respect to the circumferential direction.

In an embodiment that is not shown, the carcass structure comprises at least two carcass plies radially juxtaposed over one another. In this case, the reinforcing cords are essentially parallel to one another in each carcass ply and are oriented according to directions inclined with respect to the equatorial plane of the tyre in each carcass ply and according to opposite directions with respect to the cords of the radially adjacent carcass ply 3 (carcass with crossed plies).

The carcass structure 2 is typically coated, on the inner walls thereof, by a sealing layer 100, or so-called "liner", essentially consisting of an airtight layer of elastomeric material, adapted to ensure the hermetic seal of the tyre itself 1 once inflated.

The (or each) carcass ply 3 is shaped according to a substantially toroidal configuration and has the axially opposite lateral edges thereof 3*a* turned around respective annular reinforcing structures 4 configured to hold the tyre 1 on a corresponding mounting rim (not shown). The annular reinforcing structures 4 are typically called "bead cores".

On the outer perimeter edge of the bead cores 4 a tapered elastomeric filler 5 is applied, which occupies the space defined between the respective carcass ply 3 and the corresponding turned side edge 3*a* of the carcass ply 3.

In a further alternative embodiment, that is not shown, each carcass ply has the opposite side edges thereof associated without turning with particular annular reinforcing structures provided with two metallic annular inserts.

The area of the tyre 1 comprising the bead core 4 and the elastomeric filler 5 forms the so-called bead 9, which is intended for anchoring the tyre 1 on the rim, not shown.

Preferably, a carcass reinforcement structure can be provided in a radially outer position with respect to the carcass structure (both in the case of radial carcass and carcass with crossed plies). Such a carcass reinforcement structure comprises a crown ply arranged in a radially outer position with respect to the radially outermost carcass ply and at at least one crown portion of the radially outermost carcass ply. The crown ply comprises reinforcing elements arranged parallel to each other. The crown ply is arranged on the radially outermost carcass ply so that the reinforcing elements of the crown ply have angles opposite to those of the radially outermost carcass ply with reference to the equatorial plane. Optionally, the carcass reinforcement structure also comprises two plies arranged on opposite sides with respect to the crown ply and not associated with the respective beads.

In an embodiment thereof, the (or each) carcass ply 3 is made by bringing together a plurality of strips of elastomeric material reinforced by the aforementioned cords.

A belt structure 6 comprising at least one belt layer 6*a* typically formed of rubber-coated textile or metallic cords is circumferentially applied on the carcass structure 2, in radially outer position thereof.

Preferably, the belt structure 6 is of the zero degrees type, i.e. the belt layer 6*a* is made through cords arranged substantially parallel and side-by-side to form a plurality of turns. Such turns are substantially oriented according to the circumferential direction (typically with an angle between 0° and 5°), such a direction usually being called "zero degrees" with reference to its laying with respect to the circumferential direction of the tyre 1.

Preferably, the belt layer 6*a* typically called "zero degrees" can comprise axially adjacent windings of a single cord or of a band of rubber-coated fabric comprising axially adjacent cords.

The cords of the zero degrees belt layer 6*a* are typically metallic cords, made through steel wires having high carbon content, that is steel wires with a carbon content of at least 0.6-0.7%. Preferably, such metallic cords have a high elongation (HE).

In order to improve the adhesion between the belt structure 6 and the carcass structure 2 an adhesion layer 7 made of elastomeric material can be interposed between the two aforementioned structures.

In a different embodiment, the belt structure comprises two or more radially juxtaposed belt layers, each layer consisting of elastomeric material reinforced with cords arranged parallel to each other. The layers are arranged so that the cords of a first belt layer are oriented obliquely with respect to the equatorial plane of the tyre, whereas the cords of the radially adjacent belt layer also have an oblique orientation but they are crossed with respect to the cords of the first layer (the so-called "crossed belt") and the same applies for possible other belt layers. The crossed belt typically has textile cords.

A tread band 8 is circumferentially juxtaposed over the belt structure 6. Typically, after a molding operation carried out at the same time as a vulcanization step of the tyre 1, circumferential and transversal grooves are formed on the tread band 8, these grooves being arranged to delimit a plurality of blocks according to geometries detailed hereinafter in the present description.

According to a preferred embodiment, the tread band 8 (as well as other components of the tyre) is made through an elastomeric material as defined above.

The tyre 1 can also comprise a pair of sidewalls 10 applied laterally on opposite sides to said carcass structure 2.

With reference to FIG. 1, the tyre 1 has a section height "H" measured, on the equatorial plane "X-X", between the top of the tread band 8 and the fitting diameter, identified by a reference line "r" passing through the beads 9 of the tyre 1.

The tyre 1 also has a radial section maximum width "C", defined by the distance between the laterally opposite ends "E" of the tread band 8, and an arrow "f", defined by the distance of the top of the tread band 8 from a line passing through said laterally opposite ends "E", measured on the equatorial plane "X-X" of the tyre 1. The laterally opposite ends "E" of the tread band 8 can be formed with an edge.

The tyre 1 has a "curvature ratio" (f/C) defined by the ratio between the arrow "f" and the aforementioned radial section maximum width "C".

The tyre 1 has a ratio of "arrow over total height" (f/H) given by the ratio between the arrow "f" and the section height "H". The quoted references ("H", "X-X", "r", "C", "f", "E") have been indicated in FIG. 1 for the rear tyre but they are also identical for a front tyre.

Preferably, the arrow "f" of the tyre 1 is comprised between about 40 mm and about 60 mm.

The tyre 1 has a curvature ratio "f/C" comprised between about 0.25 and about 0.35, for example equal to about 0.26.

The tyre 1 has an arrow over total height ratio "f/H" comprised between about 0.40 and about 0.60, for example equal to about 0.43.

In the case of front tyres, the arrow "f" is comprised between about 35 mm and about 60 mm and the curvature ratio "f/C" is comprised between about 0.30 and about 0.40, for example equal to 0.38.

Again in the case of front tyres, the arrow over total height ratio "f/H" is comprised between about 0.40 and about 0.60, for example equal to about 0.53.

As shown in FIG. 2, the tyre 1 according to the invention is of the block type, i.e. it comprises a plurality of transversal and circumferential grooves that delimit a plurality of blocks spaced apart from each other.

The blocks and the grooves define a tread pattern with a void/solid ratio comprised between 0.4 and 0.65, preferably between 0.5 and 0.6, for example equal to 0.51 in the case of rear tyres of size 170/60/R17 and equal to 0.56 in the case of rear tyres of size 150/70/R18.

The blocks and the grooves are described hereinafter with reference to FIGS. 3-5.

Figure 3:
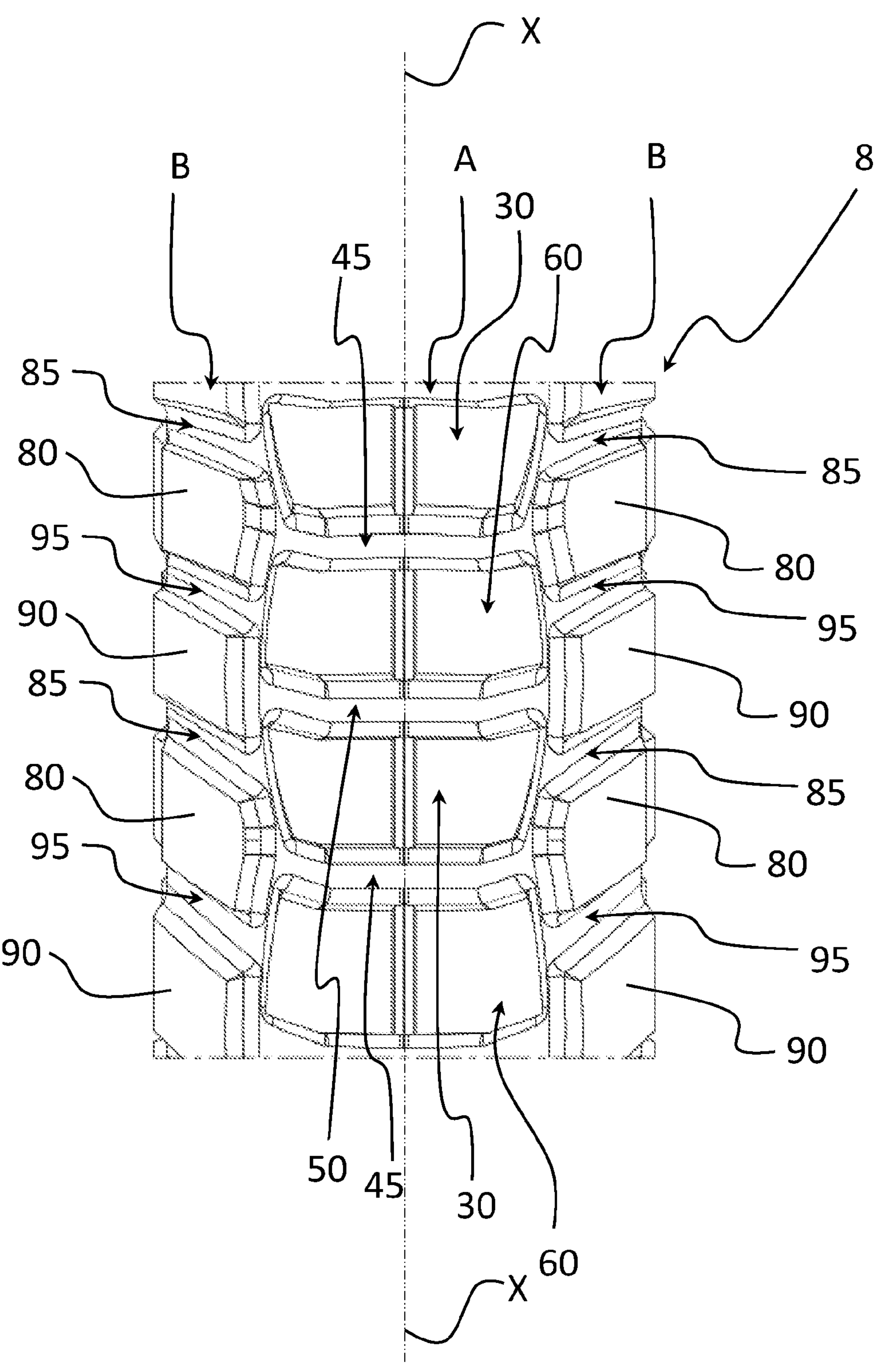
FIG. 3 is a front view of the tyre of FIG. 2.

FIG. 3 shows an enlarged portion of the tyre 1 of FIG. 2 in a front view thereof, whereas FIGS. 4 and 5 show a portion of the tread pattern of the tread band 8 of the aforementioned tyre 1. In particular, FIG. 4 shows a step module P that repeats circumferentially along the entire circumferential extension of the tyre 1. Such a module is identically reproduced in FIG. 5, where some dimensional references of particular interest are also indicated. It should be noted that FIGS. 4 and 5 are schematic drawings that do not necessarily reflect the exact mutual arrangement of the blocks and of the grooves.

As shown in FIGS. 1-5, the tread band 8 is symmetrical with respect to the equatorial plane X-X.

The tread band 8 comprises two circumferential grooves 20 arranged on opposite sides with respect to the equatorial plane X-X and that extend circumferentially without interruptions along the entire circumferential extension of the tyre 1.

The circumferential grooves 20 define in the tread band 8 a blocked central annular portion A and two opposite blocked lateral annular portions B.

The central annular portion A comprises a plurality of circumferentially consecutive central blocks 30, 60 arranged astride of the equatorial plane X-X and a plurality of circumferentially consecutive central transversal grooves 45, 50, each of which is arranged between two respective circumferentially consecutive central blocks 30, 60.

Moving along a rolling direction of the tyre 1, each central block 30 is interposed between two central blocks 60 and between a central transversal groove 45 and a central transversal groove 50. Similarly, each central block 60 is interposed between two central blocks 30 and between a central transversal groove 50 and a central transversal groove 45.

Each lateral annular portion B comprises a plurality of circumferentially consecutive lateral blocks 80, 90 and a plurality of circumferentially consecutive lateral transversal grooves 85, 95, each of which is arranged between two circumferentially consecutive lateral blocks 80, 90.

Moving along a rolling direction of the tyre 1, each lateral block 80 is interposed between two lateral blocks 90 and between a lateral transversal groove 85 and a lateral transversal groove 95. Similarly, each lateral block 90 is interposed between two lateral blocks 80 and between a lateral transversal groove 95 and a lateral transversal groove 85.

Preferably, all the central blocks 30, 60 and lateral blocks 80, 90 have a height (or depth) measured from a bottom surface of the central transversal grooves 45, 50, lateral grooves 85, 95 and circumferential grooves 20 along a direction perpendicular to the top surface of the central blocks 30, 60.

Preferably, for a rear tyre 1, like the one of FIGS. 1-5, the height of the blocks 30, 60 is comprised between about 7 mm and about 11 mm, for example equal to about 10 mm, whereas for a front tyre the height of the blocks 30, 60 is comprised between about 5 mm and about 8.5 mm, for example equal to about 7 mm.

As shown in FIG. 3, each central block 30, 60 comprises a respective circumferential recess 31, 61 arranged astride of the equatorial plane X-X, whereas no recesses are provided in the lateral blocks 80, 90.

Preferably, the height of the circumferential recesses 31, 61 is comprised between about 4 mm and about 9 mm, for example equal to about 7 mm in a rear tyre and equal to about 6 mm in a front tyre.

With particular reference to FIG. 5, all the central blocks 30, 60 have equal maximum width Lmax.

Such a maximum width Lmax is equal to, or greater than, 50% of the radial section maximum width C of the tyre 1, for example equal to 53% of the radial section maximum width C.

In some embodiments, the maximum width Lmax is comprised between about 95 mm and about 120 mm, for example equal to about 104.5 in rear tyres of size 170/60/R17 and equal to about 100.5 mm in rear tyres of size 150/70/R18.

In the exemplary embodiment illustrated herein, the central blocks 30 have a circumferential length T1 different from the circumferential length T2 of the central blocks 60. Similarly, the central transversal grooves 45 have a circumferential length I1 different from the circumferential length I2 of the central transversal grooves 50.

In particular, the circumferential lengths T1 and I1 are greater than the circumferential lengths T2 and I2.

More in particular, the circumferential length I1, I2 of each central transversal groove 45, 50 is less than the circumferential length T1, T2 of a circumferentially adjacent central block 30, 60.

In preferred embodiments, the ratio between the circumferential length I1, I2 of any central transversal groove 45, 50 and the circumferential length T1, T2 of a circumferentially adjacent central block 30, 60 is comprised between about 0.6 and about 0.8, for example equal to about 0.6, in rear tyres of size 170/60/R17 and between about 0.7 and about 0.9, for example equal to about 0.82, in rear tyres of size 150/70/R18.

Preferably, the circumferential length I1, I2 of any central transversal groove 45, 50 is comprised between about 20% and about 50% of the maximum width T1, T2 of the central blocks 30, 60, for example comprised between 21% and 34% in rear tyres of size 170/60/R17 and between 25% and 41% in rear tyres of size 150/70/R18.

Preferably, the circumferential length T1 of the central blocks 30 is such that the ratio between the circumferential length T1 and the circumferential extension of the tyre is comprised between 0.017 and 0.022, for example equal to 0.021 in rear tyres of size 170/60/R17 and equal to 0.019 in rear tyres of size 150/70/R18.

In some embodiments, the circumferential length T1 of the central blocks 30 is comprised between about 35 mm and about 44 mm, for example equal to about 42.2 mm in rear tyres of size 170/60/R17 and equal to about 37.9 mm in rear tyres of size 150/70/R18.

Preferably, the circumferential length T2 of the central blocks 60 is such that the ratio between the circumferential length T2 and the circumferential extension of the tyre is comprised between 0.013 and 0.018, for example equal to 0.017 in rear tyres of size 170/60/R17 and equal to 0.015 in rear tyres of size 150/70/R18.

In some embodiments, the circumferential length T2 of the central blocks 60 is comprised between about 28 mm and about 36 mm, for example equal to about 34.3 mm in rear tyres of size 170/60/R17 and equal to about 30.5 mm in rear tyres of size 150/70/R18.

Preferably, the circumferential length I1 of the central transversal grooves 45 is such that the ratio between the circumferential length I1 and the circumferential extension of the tyre is comprised between 0.011 and 0.018, for example equal to 0.013 in rear tyres of size 170/60/R17 and equal to 0.015 in rear tyres of size 150/70/R18.

In some embodiments, the circumferential length I1 of the central transversal grooves 45 is comprised between about 23 mm and about 55 mm, more preferably between 26 mm and 32 mm, for example equal to about 27.5 mm in rear tyres of size 170/60/R17 and equal to about 30.9 mm in rear tyres of size 150/70/R18.

Preferably, the circumferential length I2 of the central transversal grooves 50 is such that the ratio between the circumferential length I2 and the circumferential extension of the tyre is comprised between 0.008 and 0.014, for example equal to 0.011 in rear tyres of size 170/60/R17 and equal to 0.012 in rear tyres of size 150/70/R18.

In some embodiments, the circumferential length I2 of the central transversal grooves 50 is comprised between 18 mm and about 30 mm, more preferably between 21 mm and 26 mm, for example equal to 22.3 mm in rear tyres of size 170/60/R17 and equal to 25 mm in rear tyres of size 150/70/R18.

As shown in FIG. 4, each central block 30, 60 comprises opposite circumferentially outer faces 32, 62.

Each of said faces 32, 62 comprises an axially central portion 32*a*, 62*a* perpendicular to the equatorial plane X-X and a pair of axially outer portions 32*b*, 62*b* arranged on opposite sides with respect to the axially central portion 32*a*, 62*a* and inclined with respect to the equatorial plane X-X. For the sake of clarity of illustration, in FIG. 4 the reference numerals 32*b*, 62*b* are indicated only at one of the faces 32 of one of the central blocks 30 and at one of the faces 62 of one of the central blocks 60.

As shown in FIG. 5, the axially central portions 32*a* of the opposite circumferentially outer faces 32 of the central blocks 30 have different widths Lc1*i* and Lc1*u*, where Lc1*i* indicates the width of the entry face in the footprint of the tyre 1 and Lc1*u* indicates the width of the exit face from the footprint of the tyre 1, whereas the axially central portions 32*a* of the opposite circumferentially outer faces 62 of the central blocks 60 have equal widths Lc2.

Preferably, the width Lc1*i*, Lc1*u* of the axially central portions 32*a* of the circumferentially outer faces 32 of the central blocks 30, and the width Lc2 of the axially central portions 62*a* of the circumferentially outer faces 62 of the central blocks 60, is such that the ratio between such a width and the radial section maximum width C of the tyre 1 is comprised between about 0.25 and about 0.35.

For example, the ratio between the width Lc1*i* and the radial section maximum width C is equal to about 0.28, the ratio between the width Lc1*u* and the radial section maximum width C is equal to about 0.30 and the ratio between the width Lc2 and the radial section maximum width C is equal to 030.

Preferably, the widths Lc1*i*, Lc1*u* and Lc2 are comprised between about 50 mm and about 65 mm.

For example, in rear tyres of size 170/60/R17, the width Lc1*i* is equal to about 55 mm, the width Lc1*u* is equal to about 60 mm and the width Lc2 is equal to about 60 mm, whereas in rear tyres of size 150/70/R18 the width Lc1*i* is equal to about 52 mm, the width Lc1*u* is equal to about 56 mm and the width Lc2 is equal to about 56 mm.

The axially outer portions 32*b*, 62*b* of the opposite circumferentially outer faces 32, 62 of the central blocks 30, 60 have a width less than that of the respective axially central portions 32*a*, 62*a*. In particular, each of them has a width less than half the width of the axially central portions 32*a*, 62*a*.

In the specific example illustrated herein, all the axially outer portions 32*b*, 62*b* that are on the same side of the tread band 8 with respect to the equatorial plane X-X are substantially parallel to each other and inclined with respect to the equatorial plane X-X by a same angle $\alpha$ different from 90°. Such an angle $\alpha$ in FIG. 5 is illustrated only at one of the aforementioned axially outer portions, 32*b*, 62*b*.

Preferably, the angle $\alpha$ is comprised between 50° and 89°, more preferably between 55° and 85°, even more preferably between 60° and 80°, for example equal to 75°.

As shown in FIG. 4, each central block 30, 60 comprises opposite axially outer faces 35, 65 inclined with respect to the equatorial plane X-X by a predetermined angle $\gamma$, indicated in FIG. 5 only at one of the aforementioned axially outer faces 35, 65, in particular only at an axially outer face 65 of a central block 60.

Preferably, the angle $\gamma$ is comprised between 5° and 20°, for example equal to 15°.

The axially outer faces 35 of the central blocks 30 are inclined with respect to a plane perpendicular to the equatorial plane X-X on opposite sides with respect to the axially outer faces 65 of the central blocks 60 that are on the same side of the tread band 8 with respect to the equatorial plane X-X.

The area of each of the central blocks 30, 60 is preferably comprised between 2400 mm$^2$ and 4500 mm$^2$, more preferably between 3100 mm$^2$ and 2500 mm$^2$.

In the specific embodiment of the tyre 1 shown in FIGS. 1-5, the central blocks 30, 60 are circumferentially offset with respect to the lateral blocks 80, 90.

In particular, with reference to FIG. 4, the two opposite circumferentially outer points 81 of each lateral block 80 and the two opposite circumferentially outer points 91 of each lateral block 90 lay on respective planes perpendicular to the equatorial plane X-X that cross two circumferentially consecutive central blocks 30, 60. For the sake of clarity of illustration, in FIG. 4 reference numerals 81 and 91 are indicated only at one of the lateral blocks 80 and at one of the lateral blocks 90.

The sizing of the blocks and of the grooves described above is such that the projection on the equatorial plane X-X of the maximum circumferential extension of the lateral blocks 80 is greater than the circumferential length I1 of the central transversal grooves 45 and the projection on the equatorial plane X-X of the maximum circumferential extension of the lateral blocks 90 is greater than the circumferential length I2 of the central transversal grooves 50. In this way, the outlet of the central transversal grooves 45 on each of the opposite sides of the tyre 1 in a direction perpendicular to the equatorial plane X-X is obstructed by the lateral block 80 and the outlet of the central transversal grooves 50 on each of the opposite sides of the tyre 1 in a direction perpendicular to the equatorial plane X-X is obstructed by the lateral block 90.

As shown in FIG. 4, each lateral block 80, 90 comprises opposite circumferentially outer faces 82, 92 that are inclined with respect to the equatorial plane by a predetermined angle different from 90°. For the sake of clarity of illustration, in FIG. 4 reference numerals 82 and 92 are indicated only at one of the lateral blocks 80 and at one of the lateral blocks 90.

In the specific example illustrated herein, the angle of inclination of a circumferentially outer face 82, 92 of any lateral block 80, 90 is different from that of the other circumferentially outer face 82, 92 of the same lateral block 80, 90.

In particular, with reference to FIG. 5, the circumferentially outer entry face 82, 92 in the footprint is inclined by an angle β1 equal to about 65° whereas the circumferentially outer exit face 82, 92 from the footprint is inclined by an angle β2 equal to about 60°.

As shown in FIG. 4, each lateral block 80, 90 comprises an axially inner face 83, 93 having at least one part inclined with respect to the equatorial plane X-X. For the sake of clarity of illustration, in FIG. 4 reference numerals 83 and 93 are indicated only at one of the lateral blocks 80 and at one of the lateral blocks 90.

The axially inner face 83 of the lateral blocks 80 is axially inner (i.e. closer to the equatorial plane X-X) with respect to the axially inner face 93 of the lateral blocks 90. Similarly, the axially outer face 84 of the lateral blocks 80 is axially inner (i.e. closer to the equatorial plane X-X) with respect to the axially outer face 94 of the lateral blocks 90.

The axially inner face 93 of the lateral blocks 90 extends along a substantially concave surface with respect to the equatorial plane X-X (i.e. it has a concavity facing towards the equatorial plane X-X), whereas the axially inner face 83 of the lateral blocks 80 extends along a substantially convex surface with respect to the equatorial plane X-X (i.e. it has a concavity facing the opposite way with respect to the equatorial plane X-X).

In particular, the axially inner face 83 of the lateral blocks 80 comprises a part 83*a* substantially parallel to an axially outer face 35 of a central block 30 and a part 83*b* substantially parallel to an axially outer face 65 of a central block 60.

The arrangement of the lateral blocks 80, 90 with respect to the central blocks 30, 60 and the shape and relative position of the axially inner faces 83, 93 of the lateral blocks 80, 90 with respect to the axially outer faces 35, 65 of the central blocks 30, 60 is such as to ensure that each circumferential groove 20 extends along a respective substantially sinusoidal path.

Such a path is defined between two opposite generatrices, indicated hereinafter, with reference to FIG. 5, as axially inner generatrix and axially outer generatrix.

In every single module, the axially inner generatrix of each circumferential groove 20 comprises, in succession: the axially outer face 35 of the central block 30, the substantially circumferential part of the central transversal groove 50 that goes from the central block 30 to the central block 60, the axially outer face 65 of the central block 60 and the substantially circumferential part of the central transversal groove 45 that goes from the central block 60 to the central block 30. The aforementioned substantially circumferential part of the central transversal groove 50 is substantially parallel to the axially inner face 93 of the lateral block 90 whereas the aforementioned substantially circumferential part of the central transversal groove 45 is substantially parallel to the part 83*b* of the axially inner face 83 of the lateral block 80.

In every single module the axially outer generatrix of each circumferential groove 20 comprises, in succession: the part 83*a* of the axially inner face 83 of a lateral block 80, the substantially circumferential part of the lateral transversal groove 85 that goes from the lateral block 80 to the lateral block 90, the axially inner face 65 of the lateral block 90, the substantially circumferential part of the lateral transversal groove 95 that goes from the lateral block 90 to the lateral block 70, and the part 83*b* of the axially inner face 83 of a lateral block 90 circumferentially consecutive to the aforementioned lateral block 80. The aforementioned substantially circumferential part of the lateral transversal groove 85 is substantially parallel to the axially outer face 35 of the central block 30 whereas the aforementioned substantially circumferential part of the lateral transversal groove 90 is substantially parallel to the axially outer face 65 of the central block 60.

With reference to FIG. 5, each circumferential groove 20 has, at areas thereof axially interposed between a central block 30, 60 and a lateral block 80, 90, a width Le that, for the sake of clarity of illustration, in FIG. 5 is indicated only at the area axially interposed between a central block 30 and a lateral block 80.

Preferably, the width Le is comprised between 6% and 10% of the radial section maximum width of the tyre, for example equal to 8% in rear tyres of size 170/60/R17 and equal to 9% in rear tyres of size 150/70/R18.

Comparative Tests

The Applicant has made a sample of a rear tyre 1 in accordance with an embodiment of the present invention and in particular having the tread pattern shown in FIGS. 2-5. Such a tyre is indicated hereinafter with INV.

The tyre INV had identical structure and size to those of a rear tyre of the Applicant for motorcycles mainly for off-road use and currently sold on the market. Such a tyre hereinafter is indicated with Ref.

Comparative outdoor tests were carried out with the tyre Ref, which is appreciated by customers due to its excellent behavior off-road and more than acceptable behavior on dry and wet road surfaces.

The tests were carried out by mounting both the tyres (inflated with the same inflation pressure) on the rear wheel of a BMW R1250 GS motorcycle, with an identical tyre mounted on the front wheel and in substantially identical environmental conditions.

The behavior of the two tyres INV and Ref. was evaluated both on the road (dry and wet) and off-road, asking the driver to judge. In particular, the items listed in tables 1, 2 and 3 below were evaluated, where the opinion expressed by the driver is also given.

The road tests were carried out by traveling on a journey having rectilinear parts and bends, both with dry road and with wet road.

The off-road tests were carried out by traveling many times along a straight of predetermined length prepared with muddy and sandy ground that replicated possible conditions that can be encountered in real condition, keeping the ground as homogeneous as possible after every test. Two sensors were installed on the straight to determine the time of entry and exit of the motorcycle and the latter was equipped with suitable instrumentation (GPS sensor, opening sensor of the butterfly valve of the engine and speed sensors in both wheels).

Table 1 relates to tests on dry road.

Table 2 relates to tests on wet road.

Table 3 relates to off-road tests, as described hereinafter.

In the aforementioned tables, "=" indicates a positive opinion obtained through the tyre Ref. and "+" indicates an improvement with respect to the tyre Ref.

TABLE 1

| | INV | Ref. |
|---|---|---|
| Stability | = | = |
| Absorption | + | = |

TABLE 1-continued

| | INV | Ref. |
|---|---|---|
| Handling | = | = |
| Comfort relating to contact with the road | + | = |

TABLE 2

| | INV | Ref. |
|---|---|---|
| Braking | = | = |
| Traction | = | = |
| Comfort relating to driving safety | = | = |
| Handling | + | = |

TABLE 3

| | INV | Ref. |
|---|---|---|
| Absorption of impacts/obstacles | = | = |
| Handling | = | = |
| Comfort relating to driving safety | = | = |
| Traction | + | = |

Tables 1 and 2 show the tyre INV in general offered improved performance on road surfaces with respect to those of the tyre Ref, in particular with reference to comfort relating to contact with the dry road surface and to handling on a wet road surface, having a behavior in line with that of the tyre Ref. as far as the other items evaluated are concerned. The Applicant has thus had confirmation of the fact that the particular tread pattern adopted in the tyre of the invention effectively makes it possible to obtain the desired improvement of performance on a road surface.

Table 3, on the other hand, shows that there has been an unexpected improvement also in off-road performance, in particular with reference to traction. Such an improvement was neither expected nor sought, since the goal of the Applicant was to maintain the excellent off-road performance of the reference tyres.

In particular, in order to evaluate off-road traction the speed across the path was measured and it was found that, for the same speed of entry into the path, there was an increase (of a few meters per second) in the speed with which the motorcycle equipped with the tyre of the invention exited from the path with respect to the exit speed of the motorcycle equipped with the reference tyre (for example 18 m/s with respect to 15 m/s).

The unexpected improvement in off-road traction can also be deduced from the graphs of FIGS. 6 and 7. Such graphs were obtained through the instrumentation with which the motorcycle was equipped.

In FIG. 6, the X-axis shows the travel speed of the motorcycle, whereas the Y-axis shows the rotation speed of the motorcycle wheels. It should be noted that the curve relating to the motorcycle equipped with the tyre of the invention (curve with solid line) has a trend increasing in a substantially linear manner as the travel speed of the motorcycle increases, demonstrating the fact that the power delivered by the engine and transferred to the wheel translates into a substantial actual advancing of the motorcycle and therefore that the wheels of the motorcycle do not slip when the travel speed of the motorcycle increases, whereas the curve relating to the motorcycle equipped with the reference tyre (dashed curve) has a reduction in rotation speed of the wheels from a predetermined travel speed of the motorcycle, demonstrating the fact that after the motorcycle has reached a predetermined travel speed a part of the power delivered by the engine is lost due to the fact that the wheels of the motorcycle, not being able to evacuate the mud which is present between the blocks, are slowed down to the point of getting stuck in the mud.

In FIG. 7, the X-axis shows the opening speed of the butterfly valve of the engine (and therefore the rotation speed of the accelerator handle), whereas the Y-axis shows the rotation speed of the motorcycle wheels. It should be noted that the curve relating to the motorcycle equipped with the tyre of the invention (curve with solid line) has a substantially constant trend as the travel speed of the motorcycle increases (and indeed at a certain point it is possible to ease off the throttle to maintain a certain travel speed of the motorcycle), demonstrating the fact that all of the power delivered by the engine actually translates into forward motion of the motorcycle. Differently, the curve relating to the motorcycle equipped with the reference tyre (dashed curve) has an increase in rotation speed of the wheels from a predetermined opening speed of the butterfly valve of the engine, demonstrating the fact that it is necessary to keep pushing on the throttle as the travel speed of the motorcycle increases.

Of course, those skilled in the art can bring further modifications and variants to the tyre 1 described above in order to satisfy specific and contingent application requirements, these variants and modifications in any case being covered by the scope of protection as defined by the following claims.

The invention claimed is:

1. A motorcycle tyre comprising a tread band comprising a plurality of blocks and grooves defining in the tread band a void/solid ratio ranging from 0.4 to 0.65 and forming a tread pattern which is symmetrical with respect to an equatorial plane (X-X) of the tyre, wherein the tread pattern comprises a pair of circumferential grooves arranged on opposite sides with respect to the equatorial plane (X-X) and defining a central annular portion of the tread band, and a pair of lateral annular portions of the tread band arranged on opposite sides with respect to the central annular portion, wherein:

the central annular portion of the tread band comprises a plurality of consecutive circumferential central blocks arranged astride of the equatorial plane (X-X) and having a maximum width (Lmax) equal to, or greater than, 50% of a radial section maximum width of the tyre, and the central blocks are separated from one another by a respective central transversal groove having a circumferential length less than a circumferential length of a circumferentially adjacent central block; and each lateral annular portion of the tread band comprises a plurality of circumferentially consecutive lateral blocks separated from one another by a respective lateral transversal groove.

2. The tyre according to claim 1, wherein the circumferential length of a central transversal groove ranges from 20% to 50% of the maximum width (Lmax) of the central blocks.

3. The tyre according to claim 1, wherein a ratio between the circumferential length of a central transversal groove and the circumferential length of a circumferentially adjacent central block ranges from 0.6 to 0.9.

4. The tyre according to claim 1, wherein two circumferentially consecutive central blocks have different circumferential lengths.

5. The tyre according to claim 1, wherein two circumferentially consecutive central transversal grooves have different circumferential lengths.

6. The tyre according to claim 1, wherein the central blocks are circumferentially offset with respect to the lateral blocks.

7. The tyre according to claim 1, wherein each central block comprises opposite circumferentially outer faces having an axially central portion perpendicular to the equatorial plane (X-X) and opposite axially outer portions inclined with respect to a plane orthogonal to the equatorial plane (X-X) by a predetermined angle different from 90°.

8. The tyre according to claim 7, wherein each lateral block comprises an axially inner face having at least one part inclined with respect to the equatorial plane (X-X) and wherein the at least one inclined part of at least some of the lateral blocks is substantially parallel to at least one of the axially outer faces of the central block.

9. The tyre according to claim 1, wherein each central block comprises opposite axially outer faces inclined with respect to the equatorial plane (X-X) by a predetermined angle.

10. The tyre according to claim 9, wherein the axially outer faces of a central block are inclined with respect to a plane perpendicular to the equatorial plane (X-X) on opposite sides with respect to the axially outer faces of a circumferentially consecutive central block.

11. The tyre according to claim 1, wherein each lateral block comprises opposite circumferentially outer faces inclined with respect to the equatorial plane (X-X) by a predetermined angle different from 90°.

12. The tyre according to claim 1, wherein a plane perpendicular to the equatorial plane (X-X) and on which at least one first circumferentially outer tip of a lateral block of each of the lateral annular portions lies crosses a central block and another plane perpendicular to the equatorial plane and on which at least one second circumferentially outer tip of the lateral block lies crosses another central block, and the at least one second circumferentially outer tip is arranged on a circumferentially opposite side to the at least one first tip.

13. The tyre according to claim 1, wherein each lateral block comprises an axially inner face having at least one part inclined with respect to the equatorial plane (X-X).

14. The tyre according to claim 13, wherein the axially inner face of a first plurality of lateral blocks is axially more inner with respect to the axially inner face of a second plurality of lateral blocks, and each lateral block of the first plurality of lateral blocks is circumferentially arranged between two lateral blocks of the second plurality of lateral blocks.

15. The tyre according to claim 1, wherein each circumferential groove extends along a respective sinusoidal path.

* * * * *